United States Patent
Beardsley (10) Patent No.: US 7,031,525 B2
(45) Date of Patent: Apr. 18, 2006

(54) EDGE DETECTION BASED ON BACKGROUND CHANGE

(75) Inventor: Paul Beardsley, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 769 days.

(21) Appl. No.: 10/210,846

(22) Filed: Jul. 30, 2002

(65) Prior Publication Data

US 2004/0022437 A1    Feb. 5, 2004

(51) Int. Cl.
*G06K 9/48* (2006.01)

(52) U.S. Cl. .................................. 382/199; 382/154

(58) Field of Classification Search ............... None
See application file for complete search history.

(56) References Cited

U.S. PATENT DOCUMENTS

| | | | | |
|---|---|---|---|---|
| 5,561,526 A | * | 10/1996 | Huber et al. | 356/604 |
| 5,726,905 A | * | 3/1998 | Yazici et al. | 702/38 |
| 6,339,375 B1 | | 1/2002 | Hirata et al. | 340/541 |
| 6,386,325 B1 | * | 5/2002 | Fujita | 187/316 |
| 6,731,805 B1 | * | 5/2004 | Brodsky et al. | 382/199 |
| 6,873,723 B1 | * | 3/2005 | Aucsmith et al. | 382/154 |
| 2002/0044682 A1 | * | 4/2002 | Weil et al. | 382/154 |

OTHER PUBLICATIONS

Toyama et al., "*Wallflower: Principles and Practice of Background Maintenance*," Proceedings of the International Conference on Computer Vision, pp. 255-261, 1999.

* cited by examiner

*Primary Examiner*—Mark Zimmerman
*Assistant Examiner*—Alex Liew
(74) *Attorney, Agent, or Firm*—Dirk Brinkman; Andrew J. Curtin (57) ABSTRACT

A method detects edges of an object in a scene by first acquiring a static image of the scene when the scene is static, and a live image of the scene including the object. A reference image is constructed from the static image. Then, image gradients of the reference image are compared with image gradients of the live image to identify edges of the object in the live image.

12 Claims, 7 Drawing Sheets

EDGE DETECTION BASED ON BACKGROUND CHANGE

FIELD OF THE INVENTION

The invention relates generally to computer vision, and more particularly to detecting edges of an object in an image.

BACKGROUND OF THE INVENTION

It is common to use computer vision techniques to analyze images of a scene. A frequent requirement is to analyze images that vary dynamically over time. For example, in many applications, it is desired to determine whether an object such as a person has appeared in the scene.

Computer vision analysis of an object generally requires multiple processing stages. First, the object is segmented from the background. Attributes such as the shape, 3D motion and location of the object can then be determined. Finally, the object can be analyzed for the purpose of classification or recognition.

Frequently, background subtraction is usually to perform segmentation, in the case of a fixed camera observing an object appearing in front of a static background. Conventional background subtraction methods are based on per pixel intensity values. Usually, pixel intensities in a live image are subtracted from corresponding pixels in a reference image of the static scene to construct a difference image. The reference image can be acquired ahead of time when it is known that there are no moving objects in the scene. Any pixels with a low value in the difference image are considered to be part of the static background, and pixels with higher values are presumed to be part of the object. For a survey of background subtraction methods, see Toyama et al., "*Wallflower: Principles and Practice of Background Maintenance*," Proceedings of the International Conference on Computer Vision, pp. 255–261, 1999.

There are problems with conventional background subtraction techniques. First, the difference image is determined on an individual pixel basis, thus noise or artifacts can give erroneous local results. Connected-component analysis can be used to eliminate small spurious responses, but this takes extra processing. In addition, any portion of the object that has the same color (or intensity in gray-scale images) as portions of the reference image are difficult to detected. In this case, color or intensity gradients at the silhouette boundary or internal shadows may still be visible. This indicates that only those parts of the image with color or intensity gradients (edges) are truly reliable for detecting the object versus the background.

Therefore it is desired to compute the edges for the object in a direct fashion, unlike conventional background subtraction.

Segmentation of the object from the static background can be followed by further analysis. Many prior art computer vision systems use a single camera. It is well known that extracting information such as shape, 3D motion and location from images acquired by a single stationary camera is difficult. As cameras are becoming relatively inexpensive, stereo analysis of multiple camera images will become more prevalent. Stereo analysis provides a more robust measurement of the shape, 3D motion and location of object than is possible with a single camera.

Stereo processing requires a choice of what features to match between images—pixels or features such as points or edges. More specifically, edges are usually linked into edge chains as part of the edge detection process before subsequent processing. Stereo matching of edge chains is complicated by the fact that the edge chains for a given object may be computed differently in different images. For example, a given physical contour for the object, i.e., a silhouette boundary or a surface texture boundary, may be detected as one or more edge chains in each stereo image, with the chains having different termination points in different images, and the chains may connect between the object and the background texture in arbitrary ways in the different images.

Therefore it is desired only to chain edges that correspond to physical contours of the object.

There are a large number of image based systems for controlling operation of elevator doors, see U.S. Patent Application No. 2001/0045327 "Elevator Door Control Device," filed on Apr. 4, 2001. However, those systems do not discriminate types of passengers. Also see U.S. Pat. No. 6,339,375 issued to Hirata et al. on Jan. 15, 2002 "Image monitoring apparatus and image monitoring method," that describes a system for detecting whether a passenger is in an elevator doorway. The doorway is determined by pattern matching to static, straight horizontal and vertical lines that form the doorway. The two-dimensional line information is reduced to one-dimensional information. Obviously, that method is unsuited for detecting irregularly shaped moving objects.

Japanese Patent Publication No. 11–268879 describes an elevator control system where two cameras are mounted on a ceiling, and acquired images are analyzed to discriminate types of waiting passengers based on top planar shapes and heights of the passengers. That system requires manual activation by the passenger by pushing a call button and ceiling mounted cameras.

U.S. Pat. No. 6,386,325 issued to Fujita on May 14, 2002 describes an "Elevator system with a hall scanner for distinguishing between standing and sitting elevator passengers." That system also requires manual activation by having the passenger push a call button and is only able to monitor passengers who have operated the hall call button. This system uses conventional background subtraction to generate a 2D difference image. The 2D difference image is compared with prestored models of wheelchair configuration. The only configurations shown are a direct frontal and side view of a wheelchair user.

There are major problems with that system. First, because the system uses conventional background subtraction, it has the inherent problems of being able to generate a useful difference image, as described above. Second, it is unlikely that any view acquired by the cameras will ever resemble the configurations show. In fact, the number of different configurations of ambulatory persons and wheelchair users are innumerable. Fujita does not disclose how the basic configuration patterns are matched to any arbitrary view. It is well known in vision systems that pattern matching is an extremely difficult problem, with solutions only in constrained configurations. Third, the background subtraction only supplied a 2D model, no depth information, or movement within the object can be determined.

Therefore it is desired to provide a wheelchair detection system, which does not use background subtraction, and which does not require prestored models, and which is based on 3D information.

SUMMARY OF THE INVENTION

The present invention provides a method and system for discriminating between an ambulatory person and a wheelchair user. In a specific application, the system detects the presence of a wheelchair user at a location where wheelchair adaptive services may need to be provided. For example, the location can be in front of an automatic door, and the system can automatically open the door for a longer period of time than would normally be the case.

In another application, the wheelchair user is waiting for an elevator, or some other type of lifting device. Upon detecting the wheelchair user in this case, specialized elevator services can be provided. For example, the elevator floor can be leveled more precisely with the floor, and the elevator door can be held open for a longer period of time on entry and exit of the wheelchair. In addition, an elevator car specially designed for transporting wheelchairs can be assigned to service the wheelchair user, or servicing can be prioritized.

In the prior art, it is generally required that the wheelchair user indicates the need for the specialized services by pressing a button located at the location. However, not all wheelchair users are able to manually active a signal. There may be other reasons why a manually system is impractical, or less than optimal. Therefore, the invention replaces the manual systems of the prior art with a fully automated system.

The invention uses a computer vision system, which includes multiple cameras mounted at the location, specifically a calibrated trinocular camera system. The cameras acquire a sequence of images of a scene at the location, and the images are processed in four stages.

First, edges are detected for an object in the scene using image intensity gradients. Second, the edges are linked, using stereo disparity, to make chains that correspond to physical contours of the object. Third, a 3D reconstruction of the object is computed. Fourth, each object in the scene, e.g., an ambulatory person or a wheelchair user, is classified. Subsequently, classification dependent operations can be performed. If there are multiple objects in the scene, this is handled by segmenting the 3D reconstruction into individual objects.

DETAILED DESCRIPTION OF THE PREFERRED EMBODIMENT

System Overview

Figure 1:
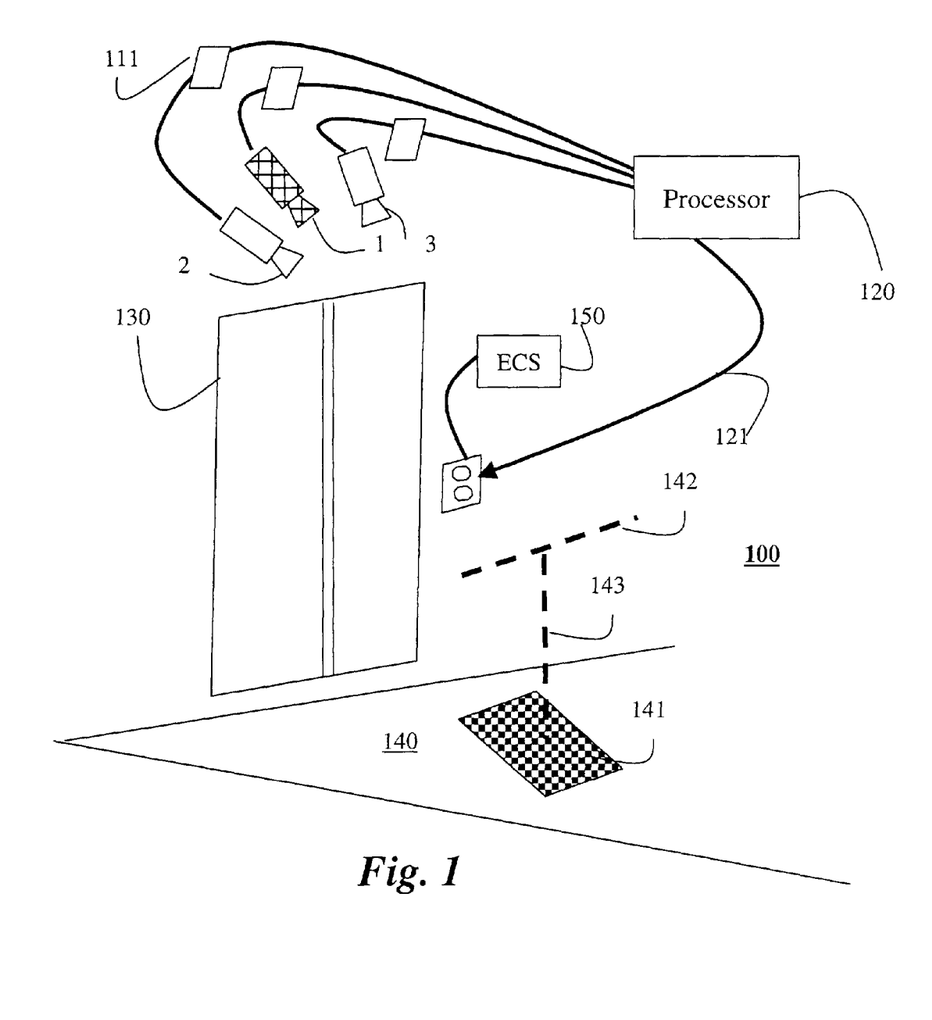
FIG. 1 is a block diagram of an object detection system according to the invention.

FIG. 1 shows an object detection 100 according to the invention. The system 100 includes multiple cameras 1, 2 and 3, e.g., three, having their outputs connected to a processor 120 configured to perform computer vision processing, as described herein. An output signal 121 of the processor 120 is connected to an external system, for example, an elevator control system (ECS) 150. The external system 150 is controlled according to what is observed by the cameras.

The cameras 1–3 are mounted above elevator doors 130 so that images 111 acquired by the cameras are of a scene 140 in front of the elevator doors. It should be noted that the cameras can be mounted anywhere proximate to the scene. The cameras can use gray-scale or color sensors. The intrinsic and extrinsic parameters of the cameras 1–3 can be determined using any known calibration procedure. For purpose described below, the center (cross-hatched) camera 1 is the primary camera, and the two other cameras 2–3 are secondary cameras. The three cameras enable a more robust analysis with the method according to the invention then prior art single or stereoscopic cameras.

System Operation

Figure 2:
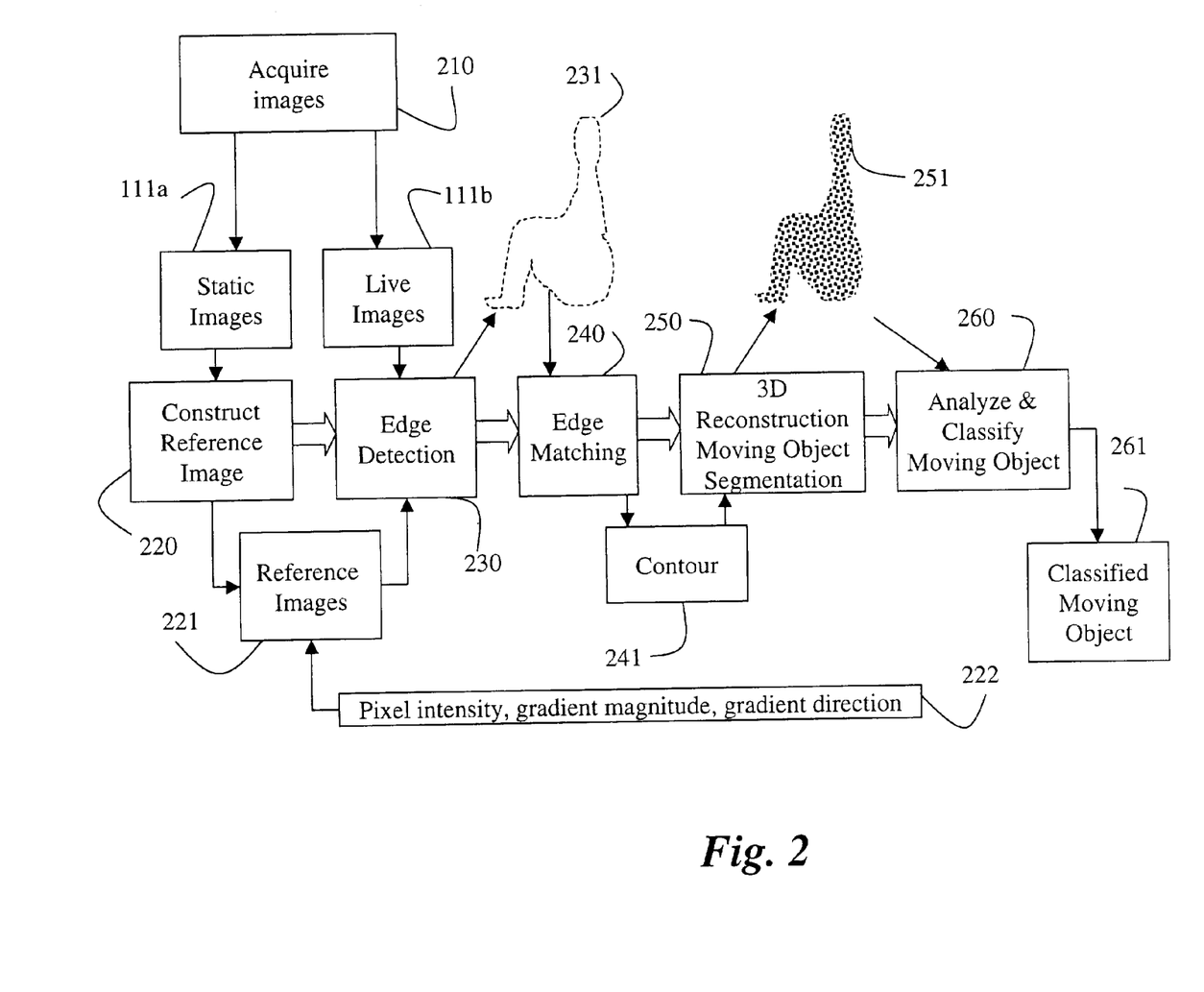
FIG. 2 is a flow diagram of an object classification method according to the invention.

As shown in FIG. 2, static images 111a and live images 111b are acquired 210 by the three cameras 1–3. The images 111 can be gray-scale or in color. In a pre-processing step, the images 111a–b can be resampled to remove radial distortion. First, reference images 221 for each camera are constructed 220 from the static images 111a of the corresponding camera.

Next, the reference images 221 for each camera is applied 230 to each of the live images 111b of the same camera, on a one-to-one basis, to detect edges 231 of an object in the scene 140. Edge matching 240 identifies edge chains 231 that form part of the same contour 241. Three-dimensional reconstruction 250 is applied to the contour 241 to segment a 3D moving object 251. The segmenting identifies only the pixels (set of data points) that are associated with the moving object. Because the pixels have coordinates, the set of data points reveal the general shape of the 3D object.

The 3D moving object 251 can now be analyzed 260 for the purpose determining a classification 261 of the object, for example, the object is an ambulatory person or a wheelchair user. The classification can be used to determine subsequent operation of the external system 150.

Edge Detection Based on Background Change

Reference Image

In contrast to the prior art pixel-based background subtraction, the invention uses edge detection based on background change 230. The reference images 221 are constructed 220 for each camera from two or more images of the static scene 111a. This operation is done during a preprocessing step when it is known that there are no moving objects in the scene. The reference image can be updated on a periodic basis.

For each pixel in the reference image 221, the following mean and variance values (Gaussians) 222 are determined from the static images 111a. A mean and variance of the pixel's intensity, a mean and variance of the pixel's gradient magnitude, and a mean and variance of the pixel's gradient direction. If the images are taken with a color camera, then only one of the RGB channel needs to be used.

Edge Detection

Figure 3:
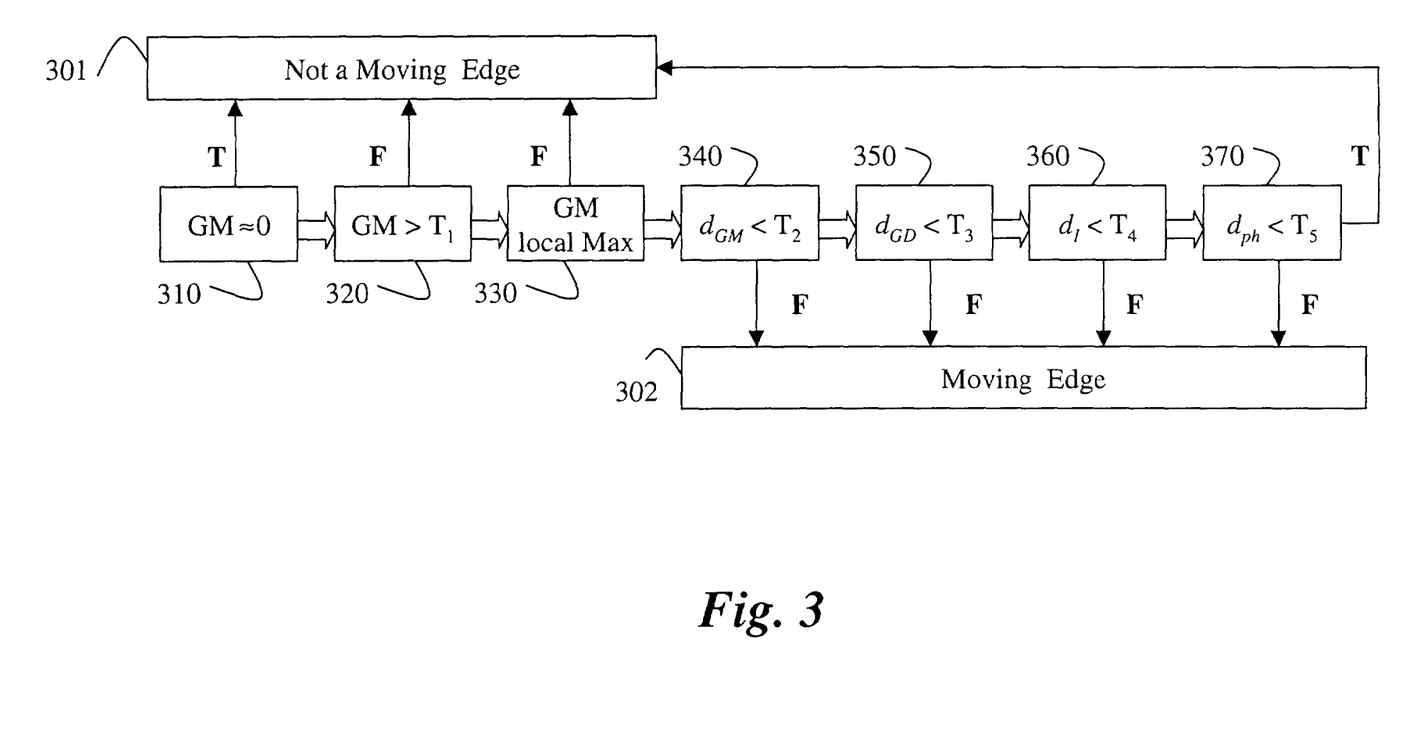
FIG. 3 is a flow diagram of a gradient-based edge detection according to the invention.

At this point, the live images 111b of the scene 104 can be processed. The three values 222 are determined, as described above, except now for a single live image 111b, and the tests shown in FIG. 3 are applied to determine whether a pixel is part of an edge 302 or not. It is presumed that a chain of edges are identified with an object. The tests can be performed in a comparator.

First, pixels with a zero or a low gradient 310 cannot be edges 301. Thus, as an advantage over the prior art, a large number of background (reference) pixels do not need to be processed on a global basis as in the prior art where every pair of pixels is subtracted.

A non-zero pixel is labeled p, and its neighbor in a gradient direction of lower intensity is labeled $p_l$, and its neighbor in a gradient direction of higher intensity is labeled $p_h$.

If the gradient magnitude (GM) is greater than a threshold T 320, continue to (b), else the pixel can be labeled as not an edge 301, If the gradient magnitude of the pixel p is a local maximum 330, i.e., the gradient at p is greater than the gradients at $p_l$ and $p_h$, continue to (c), else the pixel is not an edge 301, If a distance $d_{GM}$ between the gradient magnitude at pixel p in the live image and its corresponding value in the reference image is less than a threshold $T_2$ 340, continue to (d), else the pixel is an edge 302. Because the values are expressed in terms of Gaussian, the Mahalanobis distance is preferred.

If the Mahalanobis distance $d_{GD}$ between the measured gradient direction at p and its reference value is less than a threshold $T_3$ 350, continue to (e), else the pixel is an edge 302.

If the Mahalanobis distance $d_l$ between the intensity (RGB) value at $p_l$ and its reference value is less than a threshold $T_4$ 360, continue to (f), else the pixel is an edge.

If the Mahalanobis distance $d_{ph}$ between the intensity (RGB) value at $p_h$ and its corresponding reference value is less than a threshold $T_5$, then the pixel is not an edge 301, else the pixel is an edge 302.

Note, all pixels with a low gradient in the live images 111b are eliminated by test (a). In the case where an edge is occluding a reference pixel with a low gradient, this is detected in test (c). Thus, low unreliable reference gradients are not utilized in a way that has an adverse effect. It should also be noted that the above techniques can be used to locate background edges which are occluded by static objects in the foreground.

Having identified the edges 302, the edges can be-linked together to form edge chains, as described below in greater detail. Note, although the term "chain" is used, the process actually generates graphs of connected edge pixels in memory.

The reason for adopting this edge-based approach 230 is pragmatic. The stereo reconstruction 250 is feature-based, and edge detection directly generates the necessary contour 241 for the stereo reconstruction of the moving object 251. Having taken this approach, the advantages of gradient-base edge detection are evident.

First, the edges 231 are more reliable indicators of the presence of an object than changes in pixel intensity values. For example, global background subtraction cannot detect portions of objects that are the same color as the static background. In the case where the object is the same color (intensity) as the background, edge-changes are very likely around the silhouette of the object because of shadowing effects. Thus, background subtraction may require further processing, edge detection is straightforward, and reflects changes in the scene. While both methods are likely detect changes around the silhouette, the edge-based approach according to the invention is superior because it can determine edges at sub-pixel precision.

With the edge-based approach, spurious changes and noise are also less likely to affect the result because the processing according to the invention incorporates gradient computation, non-maximum suppression, and hysteresis for edge-chaining. All of these require a significant change in the live images 111b, and therefore, are less susceptible to local noise.

It should be noted that the reference images 221 can be updated periodically to reflect changes in ambient illumination, e.g., day/night, and alterations in the mostly static background, e.g., the placing of new objects in the scene, that remain static after entry.

Edge Chaining using Smoothly-Varying Stereo Disparity

Overview

As described above, edge detection is followed with an edge-chaining process that links neighboring edges based on similarity of attributes such as gradient direction. In a constrained case, such as an uncluttered image of a black and white calibration pattern, for example a checkerboard pattern, edge-chains may truly reflect the boundaries of the blocks in the pattern. However in real-world scenes, edge-chains may be of little physical significance. For example, edges can meander between an object and the background texture.

Therefore, there is a need to chain edges such that each chain has a good probability of belonging to an individual object. This is done by correspondence matching of edges between stereo images, and forming edge chains such that the stereo disparity of neighboring edges varies smoothly.

In stereo processing, disparity is the image displacement between corresponding features (pixels, corners, edges) in two images. Disparity is an indirect measurement of depth. Therefore edge chains with smoothly varying disparity correspond to 3D chains of smoothly varying depth, as for example arise from a silhouette and surface texture on a foreground object i.e. edge-chains with smoothly varying disparity are more likely to define a contour 241 of a 3D object 251.

A chain of this type is expected to connect the silhouette of the object and the object's surface texture, but not to connect to the static background, which is discontinuous in depth. It is the silhouette that is of most interest, as described below.

Collecting Match Hypotheses

Figure 4:
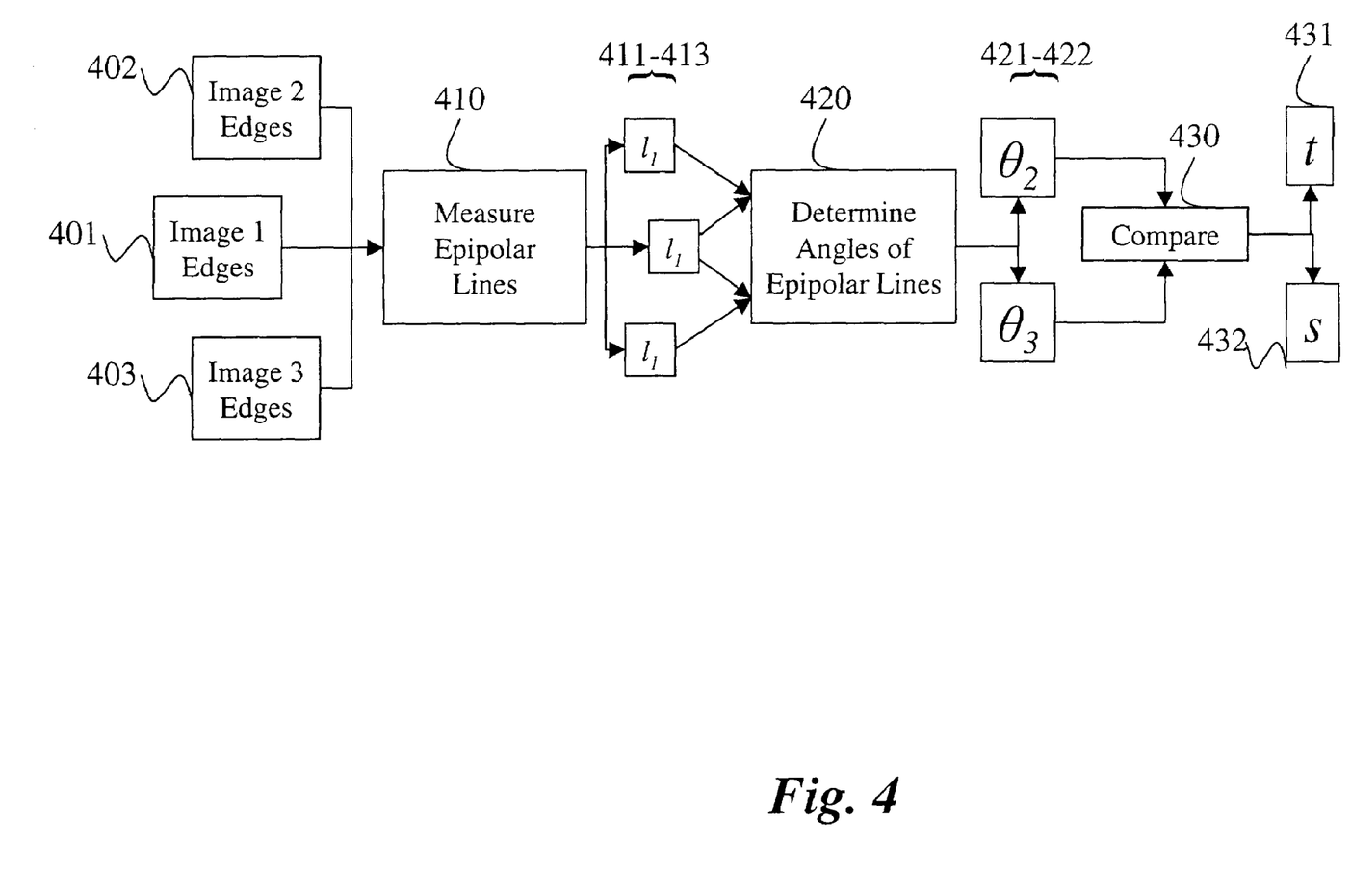
FIG. 4 is a flow diagram of identifying a target and a support image according to the invention.

Given the set of live images 111b of the scene 140, edges chains are computed as shown in FIG. 4. One approach for the correspondence matching could involve symmetric treatment of all cameras 1–3, with no favored images. However, because three cameras are used, this means a large amount of data needs to be processed. Therefore, the invention uses a technique, which reduces the amount of data to be processed.

The edges in each image are $e_{ci}$, where c=1, 2, and 3 are the camera number, and i=1, ..., n indexes the edges. Each edge in image $e_{1i}$ of the primary camera 1 is processed in turn. The goal is to identify all potential matches involving each $e_{1i}$, where a match is a triplet of corresponding edges M=<$e_{1i}$, $e_{2j}$, $e_{3k}$>, i.e., $e_{1i}$ is either unmatched, or appears in multiple images. These multiple hypotheses will subsequently undergo further processing, described below, so that each edge in an image is either unmatched, or is associated with one unique match.

One approach to the problem would be to match edge $e_{1i}$ against the edges $e_2$ in image 2, and use the edges $e_3$ in image 3 to check for supporting evidence for each putative match. This ignores the fact that the matching of edges that align with epipolar lines gives poor matching results.

Instead, each individual edge $e_{1i}$ 401 is matched with either edges in image 402, or with edges in image 403, depending on its epipolar-line alignment of the two secondary cameras 2–3.

The test to determine the desired target t image is as follows. The epipolar line which is aligned with the edge $e_{1i}$ is $l_1$ 411. Compute 410 the epipolar lines $l_2=e_{li} \times f_2$ 412, and $l_3=e_{1i} \times f_3$ 413, where $f_2$ is the epipole of camera 2 in image 1, and $f_3$ is the epipole of camera 3 in image 1.

Then, measure 420 the angle $\theta_2$ 421 between lines $l_1$ and $l_2$, and the angle $\theta_3$ 422 between lines $l_1$ and $l_3$. Then, compare 430 the two angles 421–422. The target image is the one associated with the larger θ, i.e., $e_{1i}$ has a lower epipolar-line alignment relative to the target camera. The target image 431 is labeled t. The third image is referred to as the supporting image 432 and is labeled S.

Figure 5:
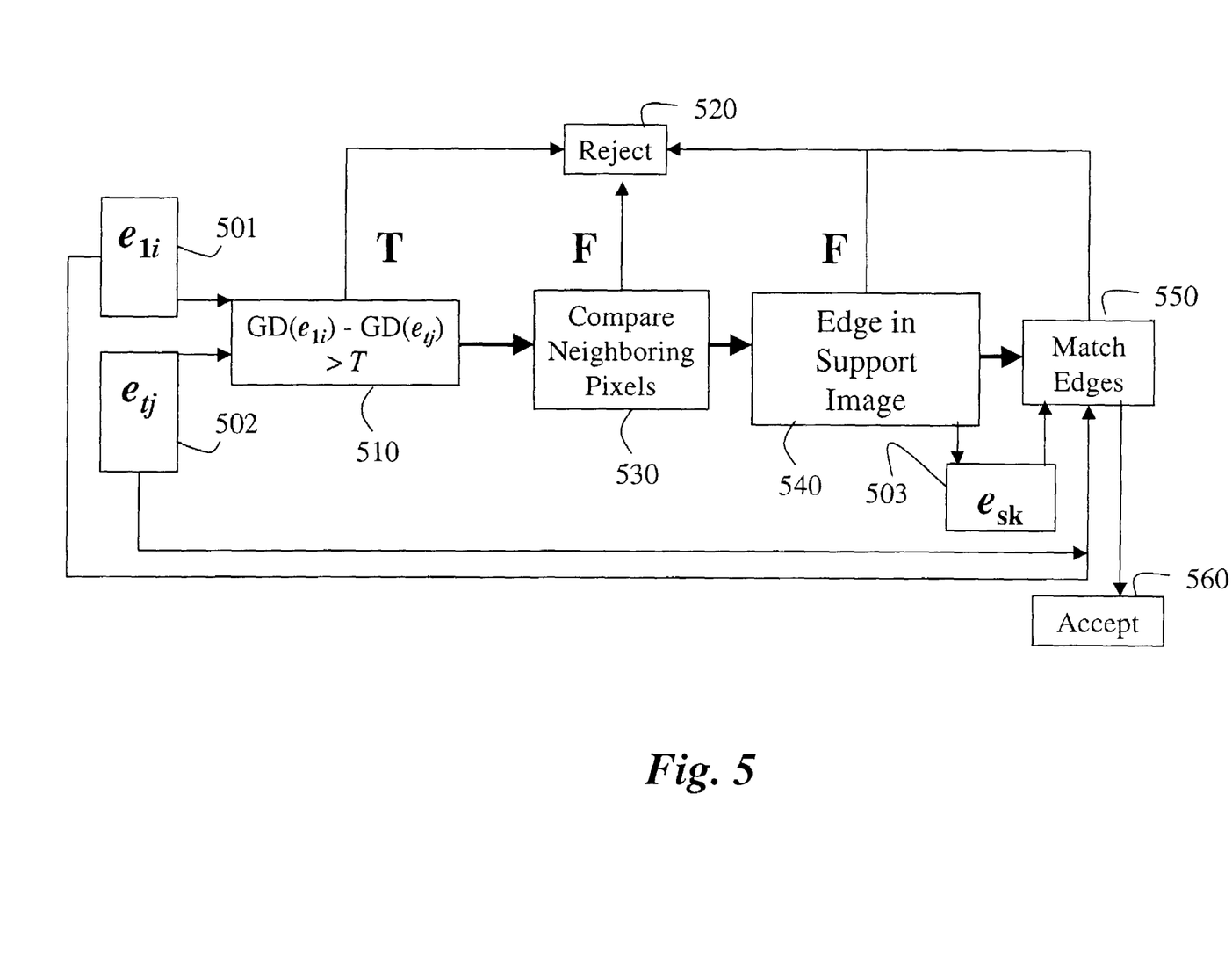
FIG. 5 is a flow diagram of matching edges according to the invention.

As shown in FIG. 5, edge $e_{1i}$ is matched against all edges along its epipolar line in image t. Matching of edges involves the following tests.

Compute 510 a difference between the gradient direction of edge $e_{1i}$ 501 and the gradient direction of edge $e_{tj}$, modulo a 180° shift. If the difference exceeds a threshold, then reject 520 the match, otherwise continue.

Else, take two neighboring pixels of $e_{1i}$, which are aligned with the gradient direction of the edges, call these $p_{1ia}$ and $p_{1ib}$. Similarly, for two neighboring pixels of $e_{tj}$, call these $p_{tja}$ and $p_{tjb}$. Use the orientation of the image to determine the correspondence of these pixels between image 1 and image t. Note, the gradient direction is not used in this test because the gradient direction may have flipped 180° between an edge and its matching edge, see below. Then, measuring 530 a difference of the intensities between the corresponding neighboring pixels. If one or both of the corresponding pixels match, then continue, else, reject 520 the match if the difference is greater than another threshold.

Given a match between $e_{1i}$ and edge $e_{tj}$, compute the epipolar lines for each of these points in the supporting image s, and find the intersection point of these lines. Then, search 540 a window around the intersection point for the nearest edge, $e_{sk}$. If there is no corresponding edge present in the support, then the match is rejected 520.

Otherwise, edge $e_{1i}$ and edge $e_{tj}$ are each matched 550 against edge $e_{sk}$ 503 as described above. If the match is acceptable, a final match score based on similarity of all three edges is computed, and the match is accepted and stored 560. To allow some robustness to failure to correctly classify edges, edge $e_{sk}$ can be any edge in the supporting image.

The tests above warrant some further discussion. In test (a), a 180° reversal in gradient direction is allowed because edges belonging to occluding contours can occlude different parts of the background as seen by different stereo cameras. Clearly gradient orientation can reverse 180° in this case, although gradient direction often is preserved.

For the same reason, test (b) requires a matching pixel on only one side of the edge because at an occluding edge, the color can have changed on the background side of the edge, so the pixel on that side of the edge will match poorly. Consequently, the thresholds for matching are deliberately lax.

Furthermore, the pixel comparison in test (b) is deliberately a weak qualitative test for matching pixel colors rather than a finely tuned quantitative test. The goal is to extract many match hypotheses for each $e_{1i}$, and to have high confidence that the true match is present, rather than trying for a winner-takes-all approach to identify a unique best match. A winner-takes-all approach is less reliable at this early stage, when matching is based purely on local attributes such as edge gradient and adjacent pixel color.

Extracting Chains from the Match Hypotheses

At this stage, there is a set of putative matches $M_p=<e_{1i}, e_{2j}, e_{3k}>$, p=1, . . . , n, where a given edge can be present in more than one match. The goal is to process the set so that each edge either is unmatched, or is associated with one unique match.

Figure 6:
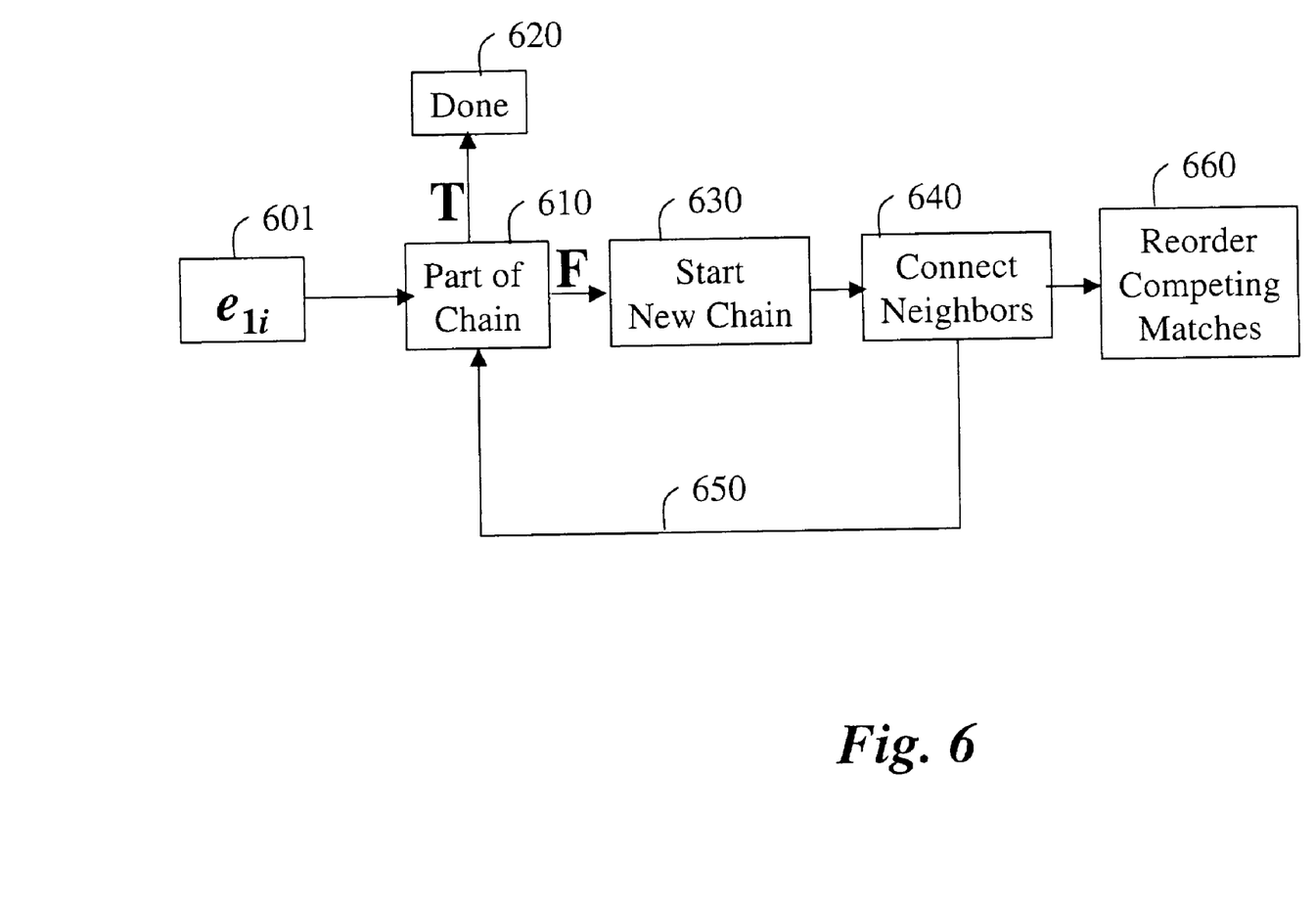
FIG. 6 is a flow diagram of chaining edges according to the invention.

This is achieved by examining all the matches and looking for those which are associated with edge chains of smoothly varying disparity. If an edge appears in more than one match, then the match which is associated with the longest chain is retained, and the other matches are eliminated. FIG. 6 shows this process.

Take each matching edge 601 in turn and determine 610 if it is already part of a chain. If the matching edge in image 1 is already part of a chain discontinue 620. Otherwise, start 630 a new chain.

Take the matching edge in image 1. Examine the eight-connected neighboring edges of that edge. If the difference between the stereo disparity of the current edge and the stereo disparity of the neighbor is less than a threshold, connect 640 the neighbor to the chain and recurse, and repeat 650 until all edges have been examined.

After the chains have been created, processing enters an iterative process which reorders 660 competing matches, i.e., matches which share an edge, until a stable solution is reached. The reordering of competing matches aims to reward the match which has the longest associated chain. The length of a chain at any stage is given by the total of (i) matches in the chain that are not competing, and (ii) matches in the chain which are competing but which are currently flagged as the winning match. The final set of winning matches are retained and passed to the next stage, 3D reconstruction 250.

Wheelchair Detection Using Stereo Vision

Stereo Calibration

The 3D reconstruction 250 requires that the cameras 1–3 are fully calibrated. Radial distortion calibration is done using the OpenCV library, available from VA Software Corporation, Fremont, Calif. The stereo calibration process utilizes a calibration pattern that is automatically detected in the stereo images. The camera's intrinsic parameters are computed, and the extrinsic parameters are determined via computation of the fundamental (F) matrix. The ground plane can be calibrated by placing a pattern 141 on the scene, see FIG. 1, and using the homography between stereo images to determine the 3D coordinates of the ground plane.

Segmenting Individual Objects in the Scene

In one application, the 3D moving object 251 in the scene 140 is analyzed to determine if the object is an ambulatory person or a wheelchair user. Because the 3D contour is based on smoothly-varying disparity, which does not cross depth discontinuities, it provides a good basis for segmentation of both occluded and non-overlapping individuals, see Shen et al., "Shape Models from Image Sequences," Proceedings Lecture Notes in Computer Science, Vol. 800, Computer Vision-ECCV'94, Springer-Verlag, pp. 225–230, 1994.

Removing Outlying 3D Points

Figure 7:
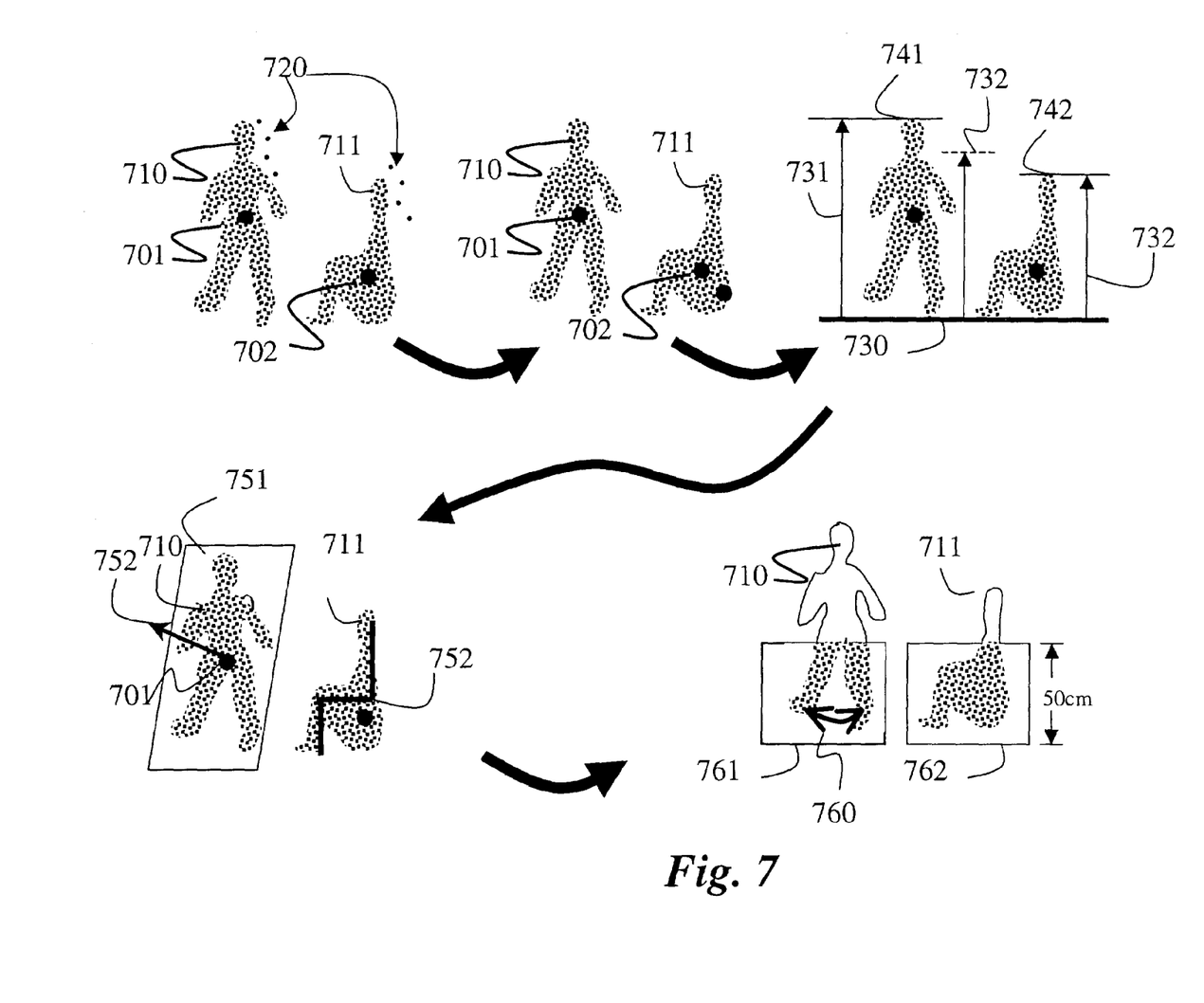
FIG. 7 is a flow diagram of wheelchair detection according to the invention.

As shown in FIG. 7, a random sampling consensus (RANSAC) process is used to estimate the centers of gravity (COG) 701–702 of the 3D points in the segmented objects 710–711 by searching for the point with a minimum median distance to the rest of the points in the data set that form the segmented object.

Then, the segmented object can be processed 715 to remove outliers 720. The threshold for outliers is set at a predetermined multiple of the median distance, e.g., two. The inlier data can then processed in the following ways.

Measurement of Height

Given the 3D data set, i.e., the points associated with 3D objects and the pre-calibrated ground plane 730, height measurement 731–732 give top-most points (maximum height) 741–742 in the data sets. In general, the height of the average (adult) ambulatory person is much greater than the height of a wheelchair user. Thus, a comparison with a threshold height 733 can be used to classify individuals who are too tall to be in a wheelchair.

Measurement of Shape

A standing or ambulatory person 710 can be approximated by a plane 751, while a wheelchair user 711 resembles a staircase shape 752. So the process here is to fit a plane to the data set and measure a goodness-of-fit. To constrain the plane-fitting process, the plane 751 passes through the estimated COG, with its normal 752 lying substantially in the horizontal plane. Then, an exhaustive search through the one remaining degree of freedom, i.e., the rotation around the vertical axis, locates the plane which minimizes the median perpendicular distance to the 3D points in the data set. A suitable shape measure is now given by the ratio of median perpendicular distance for the fitted plane over the height of the individual. This ratio is expected to be less than a predetermined threshold for ambulatory or standing individuals, whether adult or child, and greater than for wheelchair users.

Measurement of Oscillatory Foot Motion

Oscillation of the feet 760 is a strong visual cue for an ambulatory person. In contrast, a wheelchair user is rigid around the legs and feet. Therefore, a check for oscillatory motion around the bases 761–762 of the objects can assist in the classification.

All points in the 3D data set that are lower than a fixed height, typically about 50 cm, are projected to the ground plane. A straight line is then fitted to this ground plane projection. For an ambulatory person, there is a significant distance between the rear foot and the front foot at the instant when the stride is extended. Therefore, the fitted line oscillates during the course of the stride as the feet change position. Fitting a sine wave to the angle of the line over time can test for the presence of the oscillation. In contrast, the measurements of angle for the ground-plane projection of a wheelchair user are likely to be constant or vary in an inconsistent manner.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for detecting edges for an object in a scene, comprising:
   acquiring a static image of the scene when the scene is static;
   acquiring a live image of the scene including the object;
   constructing a reference image from the static image, and for each pixel in the live image:
   (a) testing if a gradient magnitude is greater than a first threshold and continuing to (b) if true, else labeling the pixel as not an object edge;
   (b) testing if the gradient magnitude is a local maximum and continuing to (c) if true, else labeling the pixel as not an object edge;
   (c) testing if a distance between the gradient magnitude at the pixel and a corresponding gradient magnitude of a corresponding pixel in the reference image is less than a second threshold and continuing to (d) if true, else labeling the pixel as an object edge;
   (d) testing if a distance between the gradient direction at the pixel and a corresponding gradient direction of a corresponding pixel in the reference image is less than a third threshold and continuing to (e) if true, else labeling the pixel as an object edge;
   (e) testing if a distance between an intensity at the pixel and a corresponding intensity of a neighboring pixel in a gradient direction of lower intensity is less than a fourth threshold and continuing to (f) if true, else labeling the pixel as an object edge; and
   (f) testing if a distance between the intensity at the pixel and a corresponding intensity of a neighboring pixel in a gradient direction of higher intensity is less than a fifth threshold and labeling the pixel as not a object edge if true, else labeling the pixel as an object edge.

2. The method of claim 1 further comprising:
   linking the edges of the object to form edge chains.

3. The method of claim 1 further comprising:
   measuring a distance between the image gradient of each pixel in the reference image and the image gradient of the corresponding pixel in the live image to identify the edges of the object.

4. The method of claim 3 wherein the distance measurement is statistical.

5. The method of claim 4 wherein the reference image is constructed from multiple static images, and further comprising:
   determining mean and variance values for the image gradients, and wherein the distance measurement is a Mahalanobis distance.

6. The method of claim 1 wherein the edges of the object are detected in stereo images to provide a 3D reconstruction for the object.

7. The method of claim 6 further comprising:
   analyzing the 3D reconstruction to determine whether the object is a wheelchair user or an ambulatory person.

8. The method of claim 7 further comprising:
   measuring a height of the 3D reconstruction to determine whether the object is a wheelchair user.

9. The method of claim 7 further comprising:
   measuring a shape of the 3D reconstruction to determine whether the object is a wheelchair user.

10. The method of claim 7 further comprising:
    measuring a rigidity at the base of the 3D reconstruction to determine whether the object is a wheelchair user.

11. The method of claim 7 wherein a signal is generated if the object is the wheelchair user.

12. The method of claim 6 wherein there are multiple objects in the scene, further comprising:
    segmenting the 3D reconstruction into an individual 3D reconstruction for each object in a scene.

* * * * *